United States Patent [19]

Tajima et al.

[11] 4,248,926

[45] Feb. 3, 1981

[54] FLASHING SHEET

[75] Inventors: Eiichi Tajima; Kaname Yamamoto, both of Tokyo; Takeshi Saito, Hoya, all of Japan

[73] Assignee: Tajima Roofing Co., Ltd., Tokyo, Japan

[21] Appl. No.: 46,000

[22] Filed: Jun. 6, 1979

[30] Foreign Application Priority Data

Jul. 26, 1977 [JP] Japan .................................. 52-88812

[51] Int. Cl.³ .............................................. B32B 7/00
[52] U.S. Cl. .................................... 428/253; 52/58; 52/408; 428/254; 428/265; 428/267; 428/343; 428/354; 428/489
[58] Field of Search .............. 428/245, 246, 253, 254, 428/265, 267, 343, 354, 489; 52/58, 61, 62, 408

[56] References Cited

U.S. PATENT DOCUMENTS

| 3,457,136 | 7/1969 | Zaadnoordijk | 428/489 |
|---|---|---|---|
| 3,937,640 | 2/1976 | Tajima et al. | 428/489 |
| 4,039,706 | 8/1977 | Tajima et al. | 428/489 |
| 4,122,230 | 10/1978 | Lowell | 428/489 |
| 4,160,058 | 7/1979 | Gall | 428/254 |

Primary Examiner—James J. Bell
Attorney, Agent, or Firm—Blanchard, Flynn, Thiel, Boutell & Tanis

[57] ABSTRACT

An improved flashing sheet suitable for the formation of a flashing seal at a non-flat part having a three dimentional shape is provided. The flashing sheet comprises a base sheet of knitted fabrics having a high expandability in all directions and a modified bitumen layer of a mixture of bitumen and rubbers. This flashing sheet can be easily and directly applied onto the non-flat part of a substrate without any complex procedures and also without causing water leakage problems of the flashing seal.

14 Claims, 9 Drawing Figures

FLASHING SHEET

The present invention relates to improved flashing sheets suitable for use, in building construction, as materials which provide watertight coverings over the various non-flat parts of the roof and walls of the building such as the edges and the corners of the roof and walls, the areas around roof drains and the areas around roof protrusions (e.g. vent pipes, skylights). The term "bituminous" and "bitumen", as used hereinbelow, may be replaced by the term "asphalt".

Heretofore, as flashing or roof flashing materials for providing watertight coverings over the above-mentioned various non-flat parts of the roof and walls, bituminous roofing or waterproofing membranes, vulcanized rubber sheets, unvulcanized rubber sheets, synthetic resin sheets and the like have been generally used. These conventional flashing sheets either do not have any base sheet or have a base sheet of such material as paper, a film of synthetic polymer, a metal foil, a woven or non-woven fabric of organic or inorganic fiber and the like. However, since these conventional flashing sheets are poor in expandability or stretchability or are of high modulus of stretch even if they are expandable or stretchable, these flat sheets cannot be, without cutting or folding, applied onto the various non-flat parts or substrates having solid or three dimensional shapes without causing water leakage problems. For this reason, these conventional flashing materials have been applied on the above-mentioned non-flat parts of the roof and wall elements as illustrated in FIGS. 1 and 2. FIG. 1 is an explanatory view illustrating a conventional flashing seal for the area around roof drains. FIGS. 2A and 2B are explanatory views illustrating a conventional flashing seal for, for example, a corner on the top of a building. As illustrated in FIG. 1, when the flashing seal is applied to an area 11 around a roof drain 12, several conventional flashing sheets 13 which are cut into appropriate sizes are partially overlapped with each other and adhered onto the area 11. Referring to FIGS. 2A and 2B, in the case where the flashing seal is applied to a corner of, for example, the top of a building, a cut line 15 is provided in a conventional flashing sheet 14, so that the flashing sheet 14 can be folded to a form 16 that fits the shape of the corner to be covered. The folded sheet 16 is adhered to the substrate by means of any conventional adhesive.

The above-mentioned application processes of the conventional flashing sheets are very troublesome and, in order to prevent the occurence of water leakage through the flashing seals, very careful attention and high skill of the workers are required. However, in fact, many water leakage problems at the flashing seals have been caused by improper watertight coverings.

Some conventional flashing sheets composed of unvulcanized rubber and having no base sheet have a low modulus of stretch and a high expandability. To a person not skilled in the art, it may appear that these flashing sheets could be applied onto non-flat parts having various three dimensional shapes. However, when these flashing sheets are deformed so as to be adhered onto the substrates of the non-flat parts, local deformation of the flashing sheets occurs and the thicknesses of the flashing sheets become non-uniform. In addition, the mechanical strength of these locally deformed portions of the flashing sheets becomes poor and the waterproofing function of these flashing sheets becomes insufficient, from a practical point of view.

Furthermore, it has also been proposed to use flashing sheets which are previously formed or shaped, from synthetic rubbers and synthetic resins, into forms that fit the shape and the dimensions of the non-flat parts to be covered by the flashing sheets. It may appear to a person not skilled in the art that these previously formed flashing sheets could be easily applied to the above-mentioned non-flat parts. However, since a wide variety of shapes and dimensions of these non-flat parts exist at a building construction site and, also, since the dimensions of the particular parts vary widely from site to site, it is not easy to adhere the previously formed or shaped flashing materials onto substrates, without causing water leakage problems.

Accordingly, the objects of the present invention are to obviate the aforementioned problems associated with the conventional flashing sheets and to provide an improved flashing sheet which is capable of being easily applied to a substrate or non-flat part of any three dimensional shape by simply deforming the flashing sheet to a form that completely fits the shape of the substrate.

Other objects and advantages of the present invention will be apparent from the following description.

In accordance with the present invention, there is provided a flashing sheet which is easily expandable or stretchable in all directions comprising:

(i) a base sheet consisting essentially of knitted fabrics made of, as a principal constituent, synthetic fibers and having a high expandability or stretchability in all directions, and;

(ii) at least one modified bitumen layer laminated on at least one surface of the base sheet, said modified bitumen layer containing a mixture of bitumen and rubber.

The present invention will now be illustrated in detail with reference to the accompanying drawings illustrating the preferred embodiments of the present invention, but is not intended to be limited to these embodiments.

BRIEF DESCRIPTION OF DRAWINGS

As illustrated in FIG. 3, the basic structure of the flashing sheet according to the present invention comprises a base sheet 21 having a modified bitumen layer 22 laminated on one surface thereof. The base sheet 21, which is used as the base material of the flashing sheet of the present invention, is composed of knitted fabrics made of, as a principal constituent, synthetic fibers, such as, for example, polyamide (e.g. Nylon) fibers or polyester fibers. These knitted fabrics naturally have a high expandability in all directions. Preferable knitted fabrics employed in the flashing sheets of the present invention are those which have an expandability or stretchability of 100% or more. Such knitted fabrics are well known to those skilled in the art.

Figure 1:
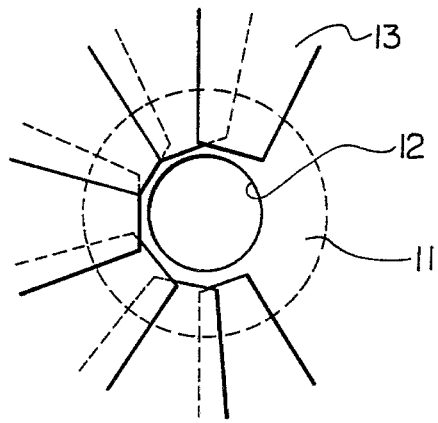
Figure 2A:
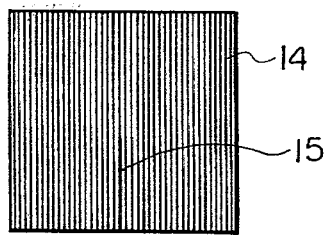
Figure 2B:
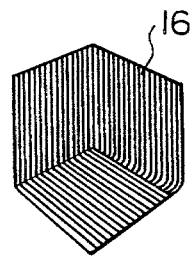
Figure 3:
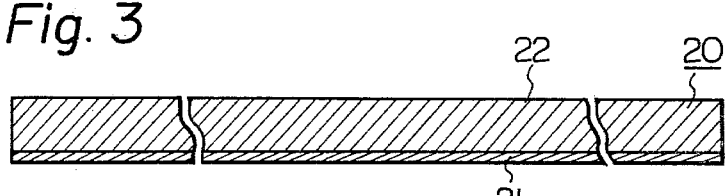
FIGS. 3 through 8 are cross-sectional views illustrating the structures of the various embodiments of the flashing sheets according to the present invention.

The modified bitumen layer 22 can be composed of a mixture of bitumen and rubber. The rubber employed in the preparation of the modified bitumen layer 22 include vulcanized or unvulcanized rubber or reclaimed rubber, for example, natural rubber and synthetic rubber, such as styrene-butadiene rubber, acrylonitrile-butadiene rubber, chloroprene rubber, butadiene rubber, isoprene rubber, butyl rubber, ethylene-propylene rubber, ethylene-propylene diene mar, polyisobutylene, chlorinated polyethylene and the like. These rubbers can be used alone or in any mixture thereof. In addition, the modified bitumen can contain conventional softeners or tackifiers, for example, rosin or its derivatives (e.g. estergum), tall oil, cumarone-indene resin, various petroleum resins or polyolefins (e.g. polybutene), various process oils, etc.

The modified bitumen layer 22 is denatured to impart thereto a high flexibility and expandability at ambient temperature or less by blending the rubber into the bitumen, while the layer 22 still has a preferable waterproofing function. The mixture of the layer 22 generally contains approximately 5 through 95% by weight of bitumen and approximately 5 through 95% by weight of rubber and, preferably contains 20 through 90% by weight of bitumen and 10 through 70% by weight of rubber. In the case where the content of the bitumen is less than approximately 5% by weight, the affinity of the modified bitumen to a bituminous waterproofing membrane becomes unpreferably poor. Contrary to this, if the content of the rubber is less than approximately 5% by weight, the flexibility and expandability of the modified bitumen at a low temperature becomes unpreferably poor. The modified bitumen layer 22 may be one or more layers. In the case where two or more layers 22 are used, these layers can be composed of the same or different compositions.

The thickness of the modified bitumen layer 22 used in the present invention may be varied over a wide range, but will generally be in the range of from 0.2 to 5 mm and, more preferably, in the range of from 0.5 to 2 mm.

A flat flashing sheet 20 having a size large enough to cover a non-flat substrate can be easily and directly applied to the substrate as mentioned hereinabove. This is because, since the flashing sheet 20 according to the present invention is easily expandable in all directions, the flashing sheet 20 can be manually deformed so as to fit the shape of the non-flat substrate to be covered. Thus, the flat flashing sheet 20 having a size large enough to cover a non-flat substrate can be, without cutting or folding, applied to the substrate by means of any conventional adhesive (e.g. hot bitumen, bituminous cement) by only applying a manual force without causing water leakage problems. After the application of the flashing sheet 20, a conventional bituminous roofing membrane may be laid over the modified bitumen layer 22 of the flashing sheet 20.

The flashing sheet of the present invention can be easily prepared at the factory in a manner similar to that used for the manufacture of the conventional bituminous roofing membranes, except that the above-mentioned base sheet and modified bitumen are used.

Figure 4:
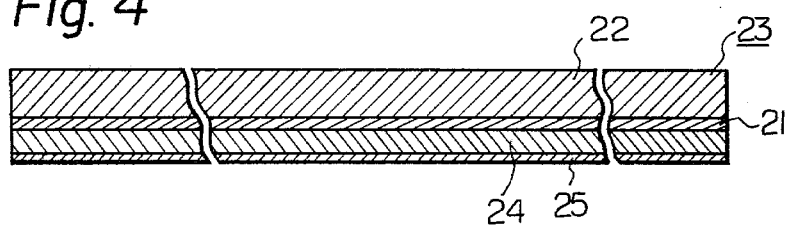

FIG. 4 illustrates another embodiment of the flashing sheet according to the present invention, in which a flashing sheet 23 comprises the base sheet 21, the modified bitumen layer 22 laminated on one surface of the base sheet 21 and an adhesive layer 24 consisting essentially of a substantially pressure-sensitive self-adhesive composition. The adhesive layer 24 is covered with a release sheet 25, which can be removed from the adhesive layer 24 by manually peeling it therefrom at ordinary ambient temperature at, for example, a construction site. According to this embodiment of the present invention, the flashing sheet 23 may be applied onto any particular substrate without using an adhesive.

The substantially pressure-sensitive self-adhesive composition used for the adhesive layer 24 has a pressure-sensitive self-adhesive property at ambient temperature or even at about −10° through −20° C. Such composition can be composed of bitumen and rubber and, optionally, additives selected from mineral oil, resin and animal or vegetable oil. Said rubber includes vulcanized or unvulcanized rubber or reclaimed rubber, for example, natural rubber or synthetic rubber such as styrene-butadiene rubber, acrylonitrile-butadiene rubber, chloroprene rubber, butadiene rubber, isoprene rubber, butyl rubber, ethylene-propylene rubber, ethylene-propylene-diene mar, polyisobutylene, chlorinated polyethylene and the like. Said mineral oil includes process oil, polymerized high boiling point high aromatic oil, paraffin, liquid paraffin, white oil, tar and the like. Said resin includes natural or synthetic resin such as, for example, rosin or its derivatives (e.g. estergum), tall oil, cumaron-indene resin, various petroleum resins, polyolefin (e.g. polybutene) and the like. Said animal or vegetable oil includes animal or vegetable oils and animal fats such as, for example, linseed oil, tung oil, sesame oil, cotton seed oil, soyabean oil, olive oil, castor oil, fish oil, whale oil, beef tallow and the like. These additives can be used alone or any combination thereof. For optimum result, it is preferred that said composition be essentially composed of 5–95% by weight of the bitumen, 3–80% by weight of the rubber, 2–60% by weight of the resin and 0–40% by weight of the mineral oil and/or the animal or vegetable oil. The thickness of the adhesive layer may be varied over a wide range, but will generally be in the range of from 0.5 to 2 mm.

Figure 5:
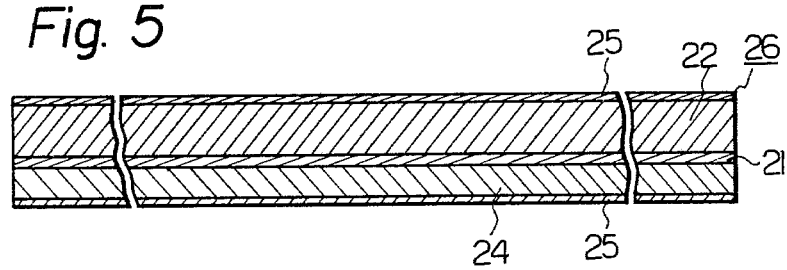

The release sheet 25 can include conventional sheet materials which are generally and widely used for covering and protecting pressure-sensitive self-adhesive surfaces, for example, paper, film and the like coated or impregnated with synthetic resins having a high releasing property, such as silicone resin, fluorine-containing resin and the like. The release sheet 25 is removed from the adhesive layer 25 before the flashing sheet 23 is used at the construction site. The release sheet 25 is used for facilitating the handling of the flashing sheet 23 having the adhesive layer 24 during the production, the storage and the transportation. The release sheet 25 can also be used for protecting or covering the modified bitumen layer 22 of a flashing sheet 26 illustrated in FIG. 5. This release sheet 25 is removed from the modified bitumen layer 22 at a construction site so as to effect a watertight adhesion between the flashing sheet and the waterproofing layer thereon.

Figure 6:
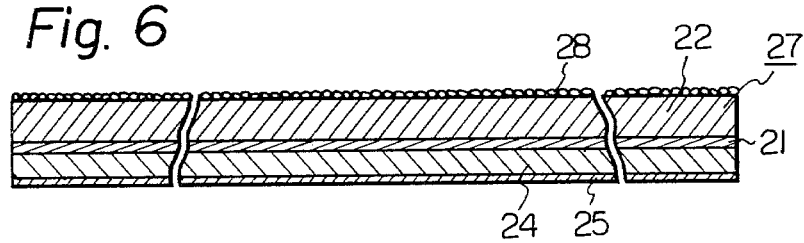

As illustrated in FIG. 6, mineral granules or powder 28, such as coarse sand, fine gravel and the like, can be deposited on one surface of the modified bitumen layer 22 of a flashing sheet 27. This layer 28 is laminated on the surface of the modified bitumen layer 22 for the purpose of preventing the blocking of the flashing sheet due to the presence of the modified bitumen layer 22.

Figure 7:
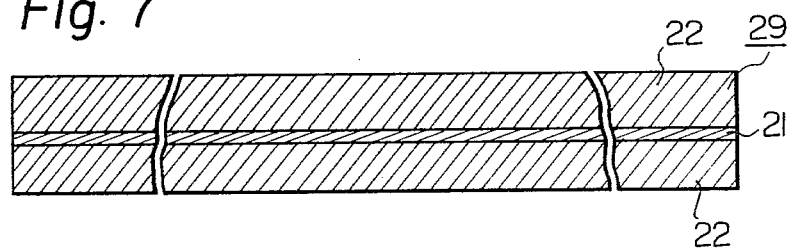
Figure 8:
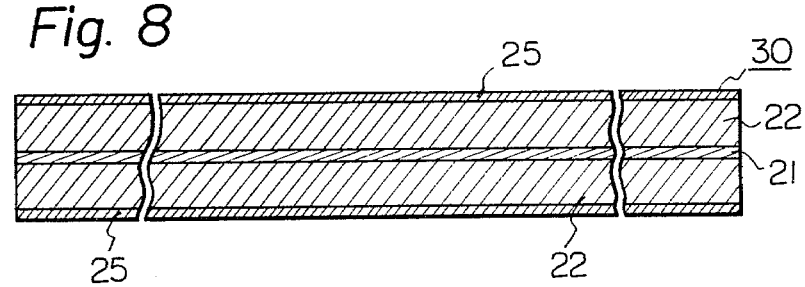

In addition, as illustrated in FIGS. 7 and 8, in flashing sheets 29 and 30, according to other embodiments of the present invention, both surfaces of the base sheet 21 can be laminated with the same or different modified bitumen layers 22. In the flashing sheet 30, the release sheets 25 are placed on the surfaces of the modified bitumen layers 22.

The flashing sheets 29 and 30 can be, without cutting or folding, applied onto the non-flat substrates mentioned above by means of any conventional adhesives such as hot bitumen, bituminous cement and the like.

Especially, in the case where the modified bitumen layer 22 is substantially composed of a mixture of 5 through 95% by weight of the bitumen, 3 through 80% by weight of the rubber, 2 through 60% by weight of the resin and 0 through 40% by weight of the mineral oil and/or the animal or vegetable oil, the flashing sheet of the present invention can be directly applied onto the non-flat substrates mentioned hereinabove without using any adhesives at ambient temperature or less (that is, the modified bitumen layer also acts as an adhesive layer).

Furthermore, the flashing sheet according to the present invention can comprise (i) a base sheet, (ii) one or two first modified bitumen layers composed of, for example, 5 through 95% by weight of bitumen and 5 through 95% by weight of rubber and, optionally, conventional softeners and/or tackifiers, (iii) one or two second modified bitumen layers having a pressure-sensitive self-adhesive property and composed of, for example, 5 through 95% by weight of bitumen, 3 through 80% by weight of rubber, 2 through 60% by weight of resin and 0 through 40% by weight of mineral oil, animal or vegetable oil or any mixture thereof and (iv) one or two release sheets. Since this flashing sheet contains the second modified bitumen layer having a pressure-sensitive self-adhesive property in addition to the first modified bitumen layer, the flashing sheet can be easily applied at a construction site by means of a cold application process (i.e. without using hot molten bitumen at a construction site) without decreasing the strength of the flashing sheet due to the presence of the relatively tough first modified bitumen layer.

The flashing sheet according to the present invention is manufactured at a factory, usually in the form of a roll, and then, applied to the particular substrate, at the construction site, after cutting the flashing sheet into a proper size to cover the particular substrate. The flashing sheet of proper size if adhered to the substrate with or without using any conventional adhesive in such a manner that the flashing sheet is manually and freely deformed so as to fit the three dimensional shape of the substrate, and that the flashing sheet is in close contact with the substrate. Generally, a cut line is not provided in the flashing sheet of the present invention during the flashing work at the construction site.

According to the present invention, the flashing seal at the non-flat parts or substrates having solid or three dimensional shapes such as, for example, the edges and the corners of roofs and walls of the building, the areas around roof drains and roof penetrations (e.g. vent pipes, skylights) can be effected without causing water leakage problems.

As mentioned hereinabove, since the present flashing sheet is easily expandable in all directions due to the facts that the flashing sheet comprises knitted fabrics having a high expandability in all directions, and a modified bitumen layer having a high flexibility and expandability, and also, since the modified bitumen layer has a preferable waterproofing property, the present flashing sheet can be simply and directly applied onto the non-flat three dimensional parts of the substrate without causing water leakage problems. Furthermore, the present flashing sheet can be conveniently applied onto the non-flat parts of the substrate without cutting and folding the flashing sheet. Even if the flashing sheet of the present invention is deformed at the construction site, so as to fit a particular three dimensional complex shape of a substrate, the deformation of the flashing sheet is not locally concentrated, but occurs uniformly, due to the facts that the modulus of stretch of the flashing sheet is low when the sheet is deformed and, also, that the knitted fabrics are used as a base sheet. The synthetic fibers of which the knitted fabrics are made have a high stretching modulus and low elongation. However, once synthetic fibers are knitted, the resultant knitted fabrics have a high expandability and stretchability due to their knitted structure. In addition, since the flashing sheet of the present invention has the base sheet and has a high deformability over a wide temperature range including a low temperature such as $-40°$ C., the present flashing sheet, after the application on site, can advantageously withstand the movement of the substrate based on external conditions such as temperature, time and load applied to the substrate. Thus, the flashing sheet of the present invention has both an excellent application workability and a high flashing seal ability.

What we claim is:

1. A multi-layer, laminated, flashing sheet, comprising: a base layer made of knitted fabric and consisting essentially of synthetic resin fibers, said knitted-fabric base layer having a high stretchability in all directions;
   at least one modified bitumen layer laminated on one surface of said base layer in direct, face-to-face, mutually adhering contact therewith, said modified bitumen layer consisting essentially of a mixture of waterproofing roofing bitumen and rubber, said modified bitumen layer being substantially waterproof and having a high flexibility and stretchability at ambient temperature and below, whereby the flashing sheet is easily stretchable in all directions and is deformable to easily conform to the shapes of non-flat parts of the roof and walls of a building.

2. A flashing sheet as claimed in claim 1, wherein said mixture contains 5 to 95% by weight of said bitumen and 5 to 95% by weight of said rubber.

3. A flashing sheet as claimed in claim 2, wherein said rubber is selected from the group consisting of natural rubber, synthetic rubbers and reclaimed natural and synthetic rubbers.

4. A flashing sheet as claimed in claim 1, claim 2 or claim 3, wherein the other surface of said base layer is laminated with an adhesive layer consisting essentially of a substantially pressure-sensitive self-adhesive composition.

5. A flashing sheet as claimed in claim 4, wherein said pressure-sensitive self-adhesive composition consists essentially of 5 to 95% by weight of said bitumen, 3 to 80% by weight of said rubber, 2 to 60% by weight of resin and 0 to 40% by weight of mineral oil, animal oil, vegetable oil, or mixture thereof.

6. A flashing sheet as claimed in claim 1, wherein two modified bitumen layers each consisting essentially of a mixture of said bitumen and said rubber are respectively laminated on the opposite surfaces of said base layer.

7. A flashing sheet as claimed in claim 6, wherein said mixture contains 5 to 95% by weight of said bitumen and 5 to 95% by weight of said rubber.

8. A flashing sheet as claimed in claim 7, wherein said rubber is selected from the group consisting of natural rubber, synthetic rubbers and reclaimed natural and synthetic rubbers.

9. A flashing sheet as claimed in claim 6, wherein said modified bitumen layers are substantially pressure-sensitive self-adhesive layers.

10. A flashing sheet as claimed in claim 9, wherein said pressure-sensitive self-adhesive layers consist essentially of 5 to 95% by weight of bitumen, 3 to 80% by weight of rubber, 2 to 60% by weight of resin and 0 to 40% by weight of mineral oil, animal oil, vegetable oil or mixture thereof.

11. A flashing sheet as claimed in claim 1, wherein said flashing sheet has two modified bitumen layers on at least one surface of said base layer, the first modified bitumen layer being located next to said base layer and consisting essentially of 5 to 95% by weight of said bitumen and 5 to 95% by weight of said rubber, and the second modified bitumen layer being located on top of said first modified bitumen layer and being a substantially pressure-sensitive self-adhesive layer consisting essentially of 5 to 95% by weight of said bitumen, 3 to 80% by weight of said rubber, 2 to 60% by weight of resin and 0 to 40% by weight of mineral oil, animal oil, vegetable oil or mixture thereof.

12. A flashing sheet as claimed in claim 1 in which said fibers have a high stretching modulus and a low elongation, said knitted fabric has a stretchability of 100% or more and said flashing sheet has a low modulus of stretch.

13. A flashing sheet as claimed in claim 1 in which said modified bitumen layer has a thickness of from 0.2 to 5 mm.

14. A flashing sheet as claimed in claim 1 in which said synthetic resin fibers are polyester or nylon fibers.

* * * * *